(12) United States Patent
Tyler et al.

(10) Patent No.: US 9,109,388 B2
(45) Date of Patent: Aug. 18, 2015

(54) DOOR COORDINATOR ACCESSORY MOUNTING BRACKET

(71) Applicant: Door Controls International, Dexter, MI (US)

(72) Inventors: Kenneth Tyler, Grass lake, MI (US); Carl F. Maynard, Chelsea, MI (US); Michael E. Lewis, Dexter, MI (US)

(73) Assignee: DOOR CONTROLS INTERNATIONAL, Dexter, MI (US)

( * ) Notice: Subject to any disclaimer, the term of this patent is extended or adjusted under 35 U.S.C. 154(b) by 0 days.

(21) Appl. No.: 14/212,436

(22) Filed: Mar. 14, 2014

(65) Prior Publication Data

US 2014/0259933 A1    Sep. 18, 2014

Related U.S. Application Data

(60) Provisional application No. 61/800,996, filed on Mar. 15, 2013.

(51) Int. Cl.
| | |
|---|---|
| E05B 65/00 | (2006.01) |
| E05F 5/12 | (2006.01) |
| F16B 7/04 | (2006.01) |

(52) U.S. Cl.
CPC ............... *E05F 5/12* (2013.01); *F16B 7/0426* (2013.01)

(58) Field of Classification Search
CPC .................................. E05F 5/12; F16B 7/0426
USPC ..................................... 49/366, 367, 369, 364
See application file for complete search history.

(56) References Cited

U.S. PATENT DOCUMENTS

| | | | | |
|---|---|---|---|---|
| 2,015,996 | A |   | 10/1935 | Eichacker |
| 3,822,506 | A | * | 7/1974 | Fishbach ......................... 49/367 |
| 3,895,461 | A | * | 7/1975 | Maynard et al. ................ 49/367 |
| 4,429,492 | A | * | 2/1984 | Imhoff ............................ 49/367 |
| 4,509,106 | A | * | 4/1985 | Mayer et al. ................... 362/267 |
| 4,949,505 | A | * | 8/1990 | Cohrs ............................. 49/367 |
| 4,967,512 | A | * | 11/1990 | Schroder et al. ................ 49/367 |
| 5,033,234 | A | * | 7/1991 | Simon et al. .................... 49/367 |
| 5,722,202 | A | * | 3/1998 | Cooper ........................... 49/109 |
| 5,727,289 | A | * | 3/1998 | Reder ............................. 16/375 |
| 6,401,393 | B2 | * | 6/2002 | Juntunen ......................... 49/367 |
| 6,449,904 | B1 | * | 9/2002 | Paasonen ........................ 49/103 |
| 6,564,510 | B2 | * | 5/2003 | Juntunen et al. ................ 49/103 |
| 6,742,302 | B2 | * | 6/2004 | Karkkainen ..................... 49/103 |
| 6,877,278 | B2 | * | 4/2005 | Karkkainen et al. ............ 49/366 |
| 2001/0025450 | A1 | * | 10/2001 | Juntunen et al. ................ 49/103 |

* cited by examiner

*Primary Examiner* — Jerry Redman
(74) *Attorney, Agent, or Firm* — Brinks Gilson & Lione

(57) ABSTRACT

An accessory mounting bracket for securing door accessories to a door coordinator. The accessory mounting bracket has stepped portions that define a channel that is sized to receive a door coordinator. A recess is disposed below the channel and provides an offset for fasteners that mount the door coordinator to a door frame and may protrude from the door coordinator. A set of bores are used to attach the accessory mounting bracket to the door coordinator and a soffit of the door, while a second bores, which are threaded, allows for attachment of a door accessory to the accessory mounting bracket. The second bores are formed in the accessory mounting bracket so as to be spaced apart from the door coordinator.

15 Claims, 7 Drawing Sheets

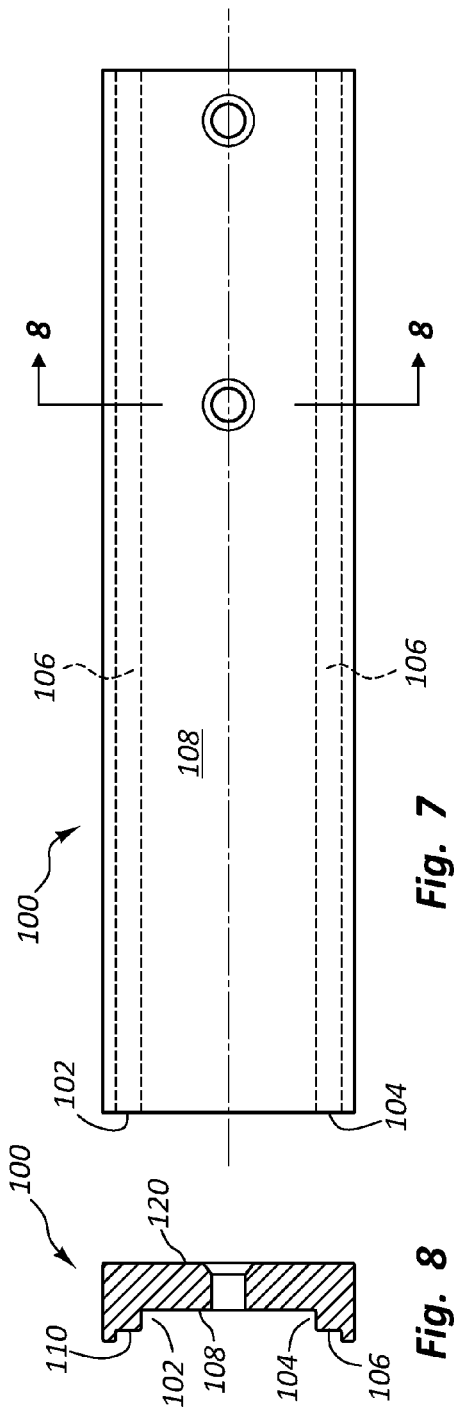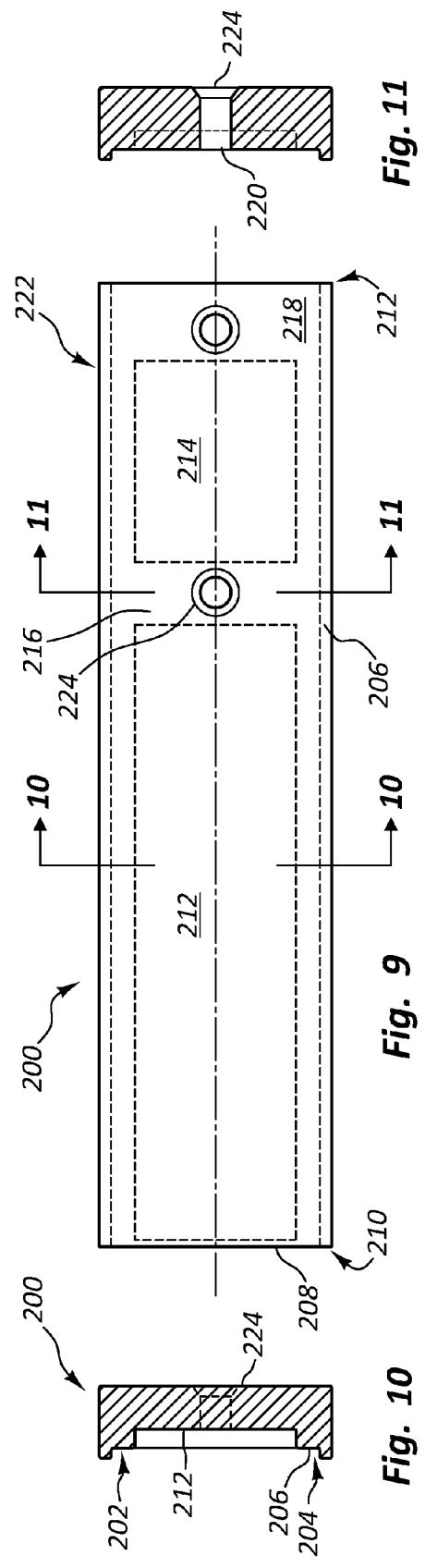

DOOR COORDINATOR ACCESSORY MOUNTING BRACKET

RELATED APPLICATIONS

The present patent document claims the benefit of the filing date under 35 U.S.C. §119(e) of provisional U.S. Patent Application Ser. No. 61/800,996 filed Mar. 15, 2013, which is hereby incorporated by reference.

BACKGROUND

1. Technical Field

Embodiments of the invention relate to companion doors and their coordinated closing and more particularly to mounting accessories to a door coordinator.

2. Background Information

Companion doors are conventionally constructed with overlapping edges, astragals and rabbeted faces to provide a seal against smoke and fire. Because of this construction of the adjacent edges of doors, the overlapping or active door must be held open until the inactive door is closed. If the active door is closed before the inactive door, the inactive door will not close properly as the adjacent edges of the door will interfere with one another. Door coordinator assemblies facilitate the proper closing of these doors.

Existing door coordinator assemblies, hereinafter just door coordinator 10, as illustrated in FIG. 1 typically include a supporting frame 11 that is mounted in an existing doorframe 12 along the top of a pair of independently moving companion doors 13, 14. The companion doors 13, 14 are mounted to the door frame 12 through hinges 16. The companion doors 13, 14 rotate about the hinges 16 and engage one another along a center line 17 of the door frame 12. An astragal 18 is mounted to one of the companion doors 14 and overlaps the other companion door 13. The astragal 18 covers any gap between the companion doors 13, 14 at the center line 17 of the door frame 12.

FIGS. 2 and 3 illustrate a door coordinator 10 in more detail. A hold-open lever 19 is pivotally mounted on the supporting frame 11 so that a free end 20 of the hold-open lever 19 will engage the active companion door 14 adjacent to its hinged edge 21 prior to closing of the active companion door 14. A trigger member 22, pivotally mounted on the support frame 11, controls the movement of a body member 23 that normally holds the hold-open lever 19 in a position engaged with the active companion door 14 so as to keep it in an open position as shown in FIG. 2. In FIG. 3 the trigger member 22 is moved by the body member 23 in response to closing of the inactive companion door 13. Closing of the inactive companion door 13 manipulates the trigger member 22, which in turn causes movement of the body member 23 such that it no longer holds the hold-open lever 19 engaged with the active companion door 14 thereby permitting closing of the active companion door 14.

Door accessories, such as a parallel arm closer, may be designed to mount to the door frame soffit. When a door coordinator is mounted to a soffit, it often blocks the mounting of any accessories directly to the soffit. However, with the above construction the interior components of a door coordinator 10 provide few options for allowing the insertion of fasteners to secure accessories directly to the door coordinator in place of the soffit. This is further compounded by the fact that door coordinator assembly manufacturers are independent from the door and doorframe manufacturers. As a result, a door coordinator assembly must be retrofitted into a wide variety of door frames, having different soffit widths and depths, which in turn means that the possible locations for fasteners to secure the door accessories to an existing doorframe often dictates that an accessory mounting bracket be employed to secure the accessories.

Current accessory mounting brackets for retrofitting door coordinators are provided as a pair of stair stepped brackets, wherein the door coordinator is received in one of the stair steps of the bracket, with the door coordinator assembly being located between the step of the bracket and the soffit. The accessory mounting bracket is mounted to the doorframe opposite the door. By using the accessory mounting brackets, fasteners can be extended into the brackets to mount accessories without interfering with the internal workings of the door coordinator. Additionally the mounting of the bracket to the doorframe can be shifted to the location where it can be better secured to the doorframe. In addition to the problem of mounting a door coordinator to a wide variety of different soffit heights and widths, the accessory mounting brackets themselves are not necessarily aesthetically pleasing and result in the accessory mounting bracket being mounted in a cantilevered position relative to the fasteners securing the bracket to the doorframe.

FIG. 4 illustrates a typical door coordinator 10 illustrating the use of accessory mounting brackets 24, 25 for mounting door accessories. FIG. 5 illustrates the door coordinator 10 installed on a soffit that is slightly wider than the door coordinator 10 and having a two-step bracket 24 for mounting accessories. FIG. 6 illustrates the door coordinator 10 installed on a soffit that is much wider than the door coordinator and having a single step bracket 25 for mounting accessories.

It would be beneficial to have a system that did not require multiple sizes of brackets for different soffit sizes and that did not have an unsightly appearance in use.

BRIEF SUMMARY

In one aspect, an accessory mounting bracket for a door coordinator is disclosed including a body having an upper surface, a lower surface, and a length, a pair of opposed steps formed in the upper surface and extending along at least part of the length of the body, the steps defining a channel therebetween with the channel extending along the upper surface for at least part of the length of the body, a recess formed in the upper surface and disposed beneath the channel, the recess extending at least part way along the length of the body, and a plurality of bores extending through the body from the lower surface to the recess.

In some embodiments the channel has a width sized to receive the door coordinator and the recess has a depth from the channel that defines a standoff from a surface of the door coordinator. In some embodiments the channel extends the entire length of the body. In some embodiments the body is an extrusion. In some embodiment the body is a casting.

In some embodiments, the plurality of bores are smooth bores. In some embodiments the accessory mounting bracket further includes a second plurality of bores extending through the body from the lower surface to the recess. In some embodiments the second plurality of bores are threaded.

In another aspect a door coordinator assembly is disclosed including a door coordinator configured to sequence the closing of companion doors, the door coordinator having a lower face, an accessory mounting bracket having a body defining an upper surface, a lower surface, and a length, a pair of opposed steps formed in the upper surface and extending along at least part of the length of the body, the steps defining a channel therebetween with the channel extending along the upper surface for at least part of the length of the body, the channel having a width sized and shaped to receive the lower face of the door coordinator between the opposed steps, a recess formed in the upper surface and disposed beneath the channel, the recess extending at least part way along the length of the body, and a plurality of bores formed in the body and extending from the lower surface of the body to the recess.

In some embodiments the door coordinator includes a second plurality of bores disposed in the lower face of the door coordinator and correspondingly aligned with the first plurality of bores. In some embodiments the first plurality of bores are smooth bores and the accessory mounting bracket further comprises a plurality of threaded bores with the threaded bores being formed in the body and extending from the lower surface of the body to the recess.

In some embodiment the door coordinator assembly includes a door accessory mounted to the accessory mounting bracket by at least one threaded fastener disposed in one of the threaded bores. In other embodiments the door coordinator includes a door accessory mounted to the accessory mounting bracket. In further embodiments, the door accessory mounted to the accessory mounting bracket includes one of a standard arm closer, a parallel arm closer, a vertical rod strike or a soffit applied hardware device.

In some embodiments the door coordinator has a first length and the accessory mounting bracket has a second length that is less than the first length of the door coordinator. In some embodiments the door coordinator has a first length and the accessory mounting bracket has a second length that is greater than the first length of the door coordinator.

BRIEF DESCRIPTION OF THE DRAWINGS

FIG. 7 illustrates an embodiment of a door coordinator accessory mounting bracket incorporating the principles of the present invention.

FIG. 8 illustrates a cross section of the door coordinator accessory mounting bracket of FIG. 7.

FIG. 9 illustrates another embodiment of a door coordinator accessory mounting bracket incorporating the principles of the present invention.

FIG. 10 illustrates a cross section of the door coordinator accessory mounting bracket of FIG. 9.

FIG. 11 illustrates a further cross section of the door coordinator accessory mounting bracket of FIG. 9.

DETAILED DESCRIPTION

The present invention will now be further described. In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

FIG. 7 illustrates the top side of an embodiment of an accessory mounting bracket 100 incorporating the principles of the present invention. FIG. 8 illustrates a cross section taken at line A-A of the accessory mounting bracket seen in FIG. 7. The accessory mounting bracket 100 may be manufactured from a durable material such as aluminum, steel, or composite materials. The door control accessory mounting bracket 100 may also be finished with a decorative finish such as paint, an anodized finish or plated. As seen in FIGS. 8 and 9, the accessory mounting bracket 100 has a body 120 with a substantially uniform cross section along a length of the body 120. Because the cross section of the body 120 is uniform, it may be manufactured by an extrusion process, providing the accessory mounting bracket 100 in substantially any desired length.

The accessory mounting bracket 100 is provided with a first step 102 and a second step 104, which are mirror images of one another on opposing sides along the length of the accessory mounting bracket 100. The steps 102, 104 define a channel 106 between the steps 102, 104. A recess or off-set 108 is formed between innermost portions the steps 102, 104, below the channel 106 in the installed position. As used herein, directional terms have meanings associated with a typical door installation. For example, the term "upper" means in a direction toward the top of the door in the installed position. Other directional terms have corresponding meanings.

Figure 13:
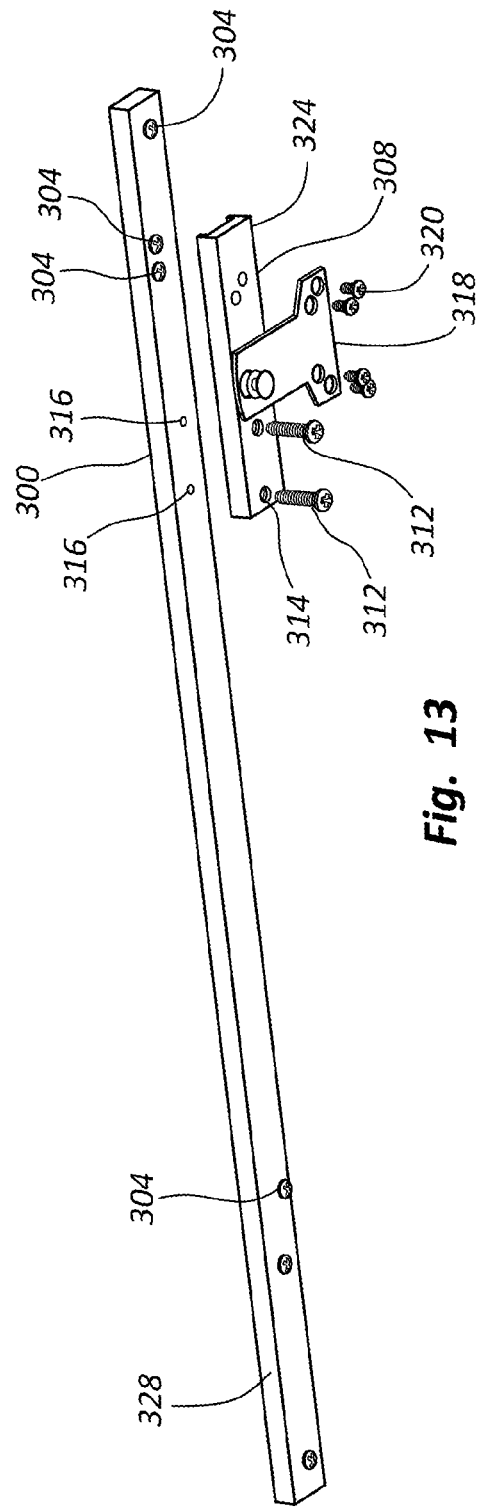
FIG. 13 illustrates a door coordinator, an accessory mounting bracket, and a door accessory.

The channel 106 is sized and shaped to receive a lower side of a door coordinator 300, which is shown in more detail in FIG. 13. The width or distance of the channel 106 between the steps 102, 104 is complementary to the width of a door coordinator 300 with which it is to be used. The depth of the recess 108 beyond the channel is such that it provides a stand-off between the accessory mounting bracket 100 and the door coordinator 300, for reasons further discussed below.

A plurality of bores 122 extend through the accessory mounting bracket 100 from the bottom surface of the accessory mounting bracket 100 to the recess 108. The bores 122 may be disposed in part of the length of the accessory mounting bracket 100 and are utilized to mount the accessory mounting bracket 100 over the door coordinator 300. Thus, a portion 124 of the accessory mounting bracket 100 may have no bores while another portion 126 may have the plurality of bores 122 disposed therein. For aesthetic purposes, the bores 122 may be countersunk.

Figure 1:
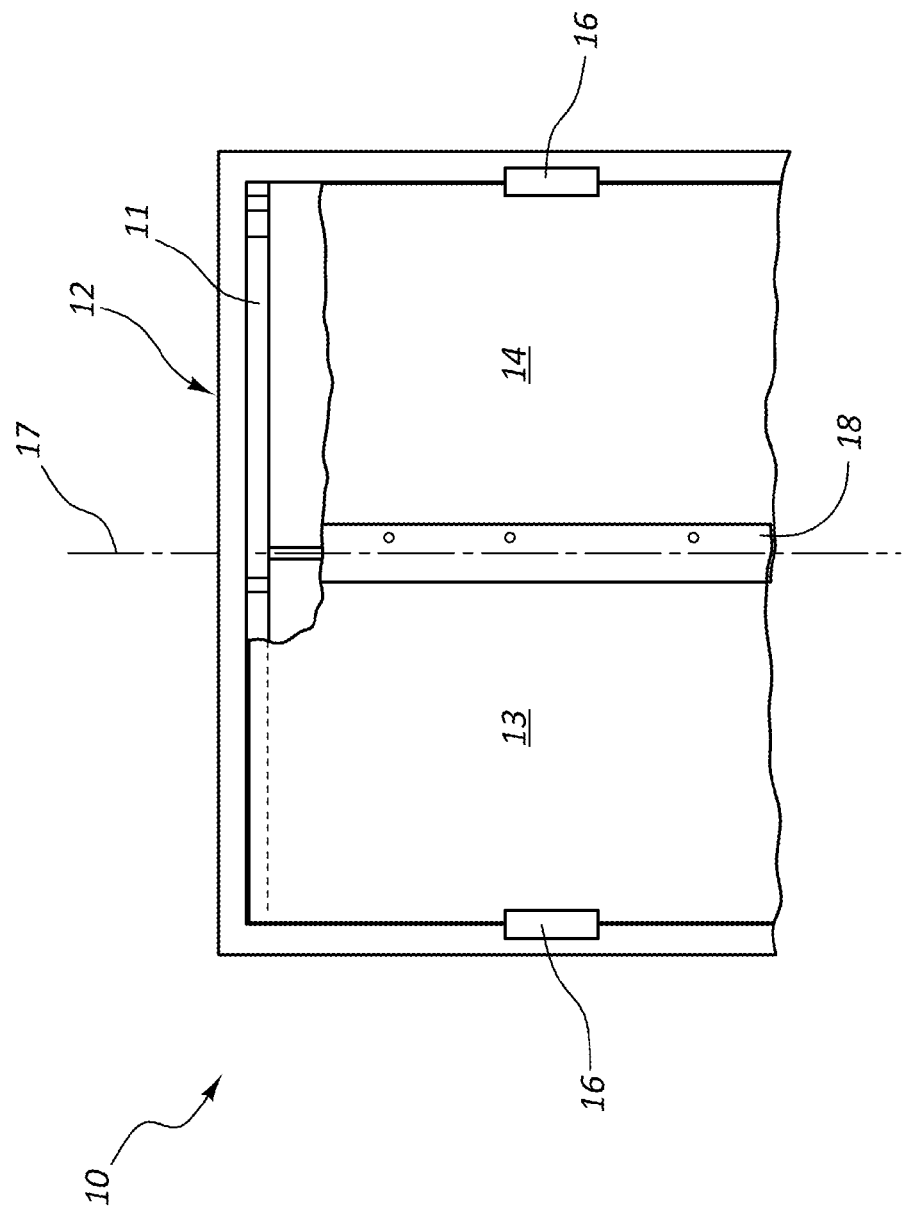
FIG. 1 illustrates a door frame having a door coordinator.
Figure 2:
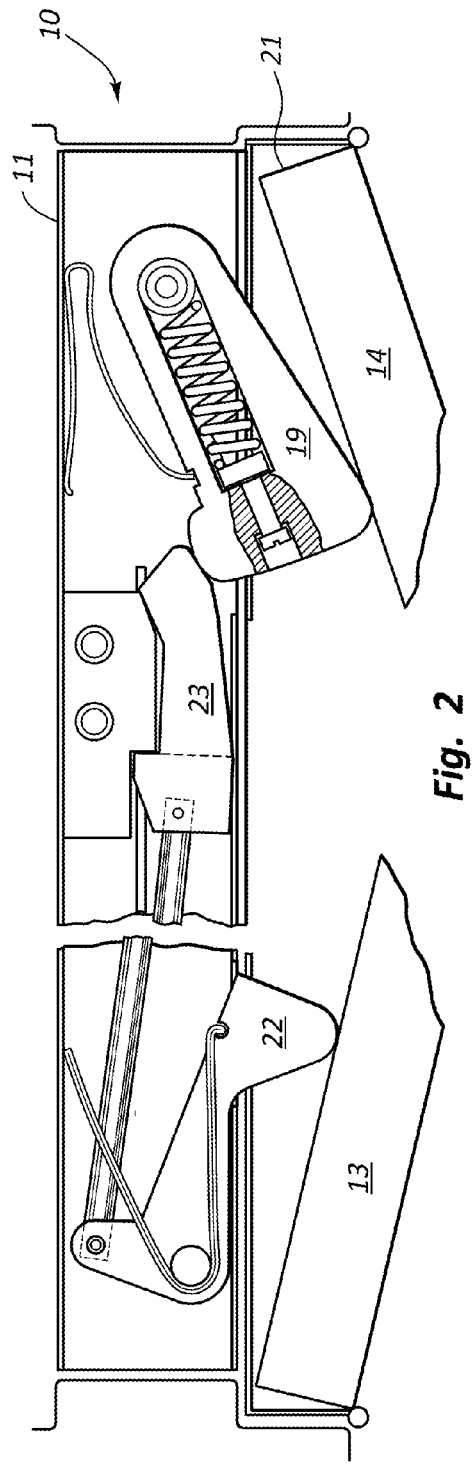
FIG. 2 illustrates door coordinator with the doors in an open position.
Figure 3:
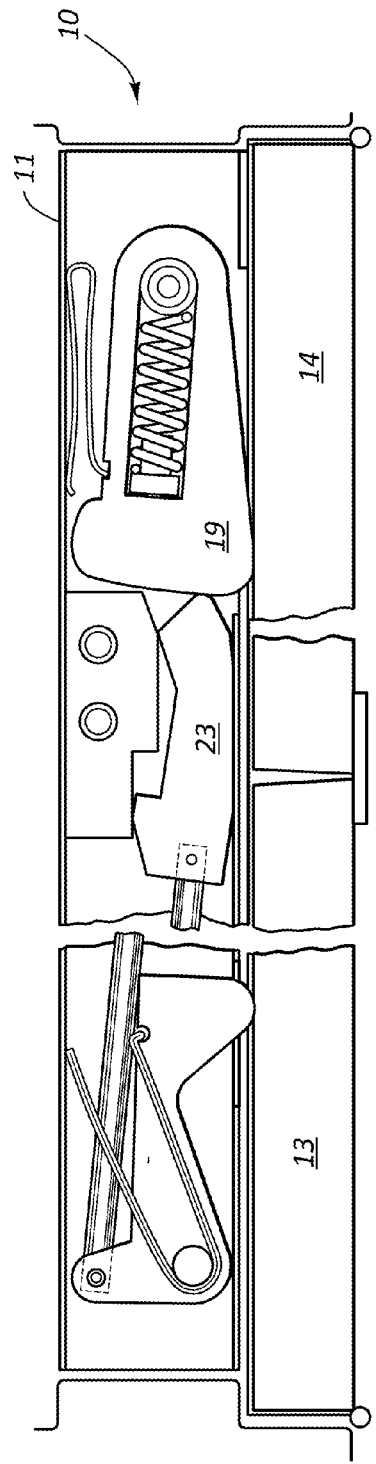
FIG. 3 illustrates the door coordinator with the doors in a closed position.
Figure 4:
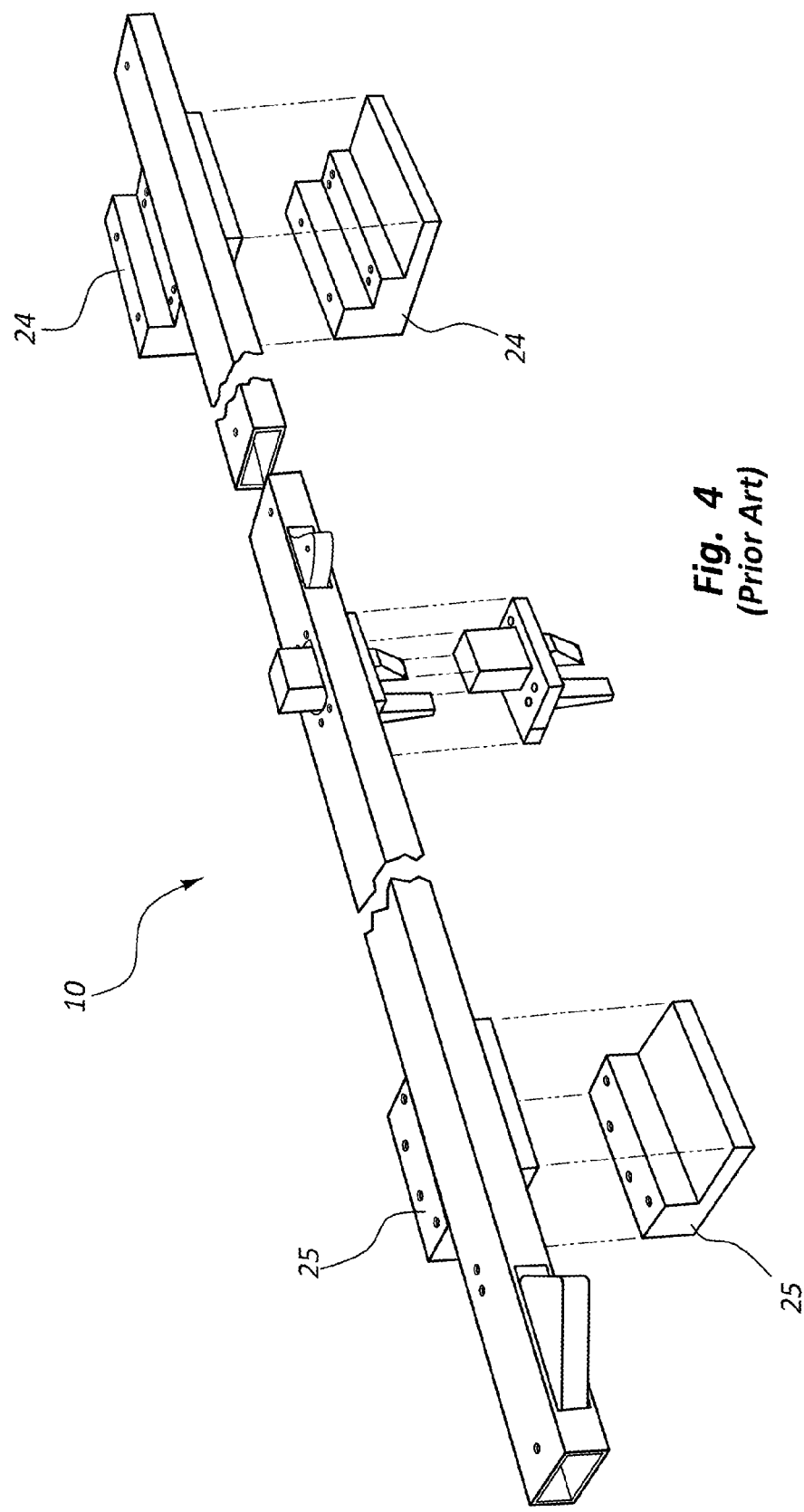
FIG. 4 illustrates a door coordinator and brackets for mounting door accessories according to the prior art.
Figure 5:
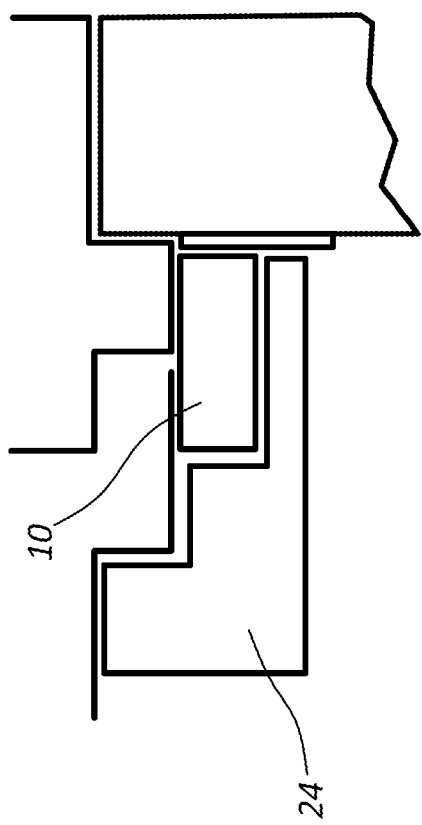
FIG. 5 illustrates an end view of a door coordinator mounted to a soffit with another prior art accessory mounting bracket in place.
Figure 6:
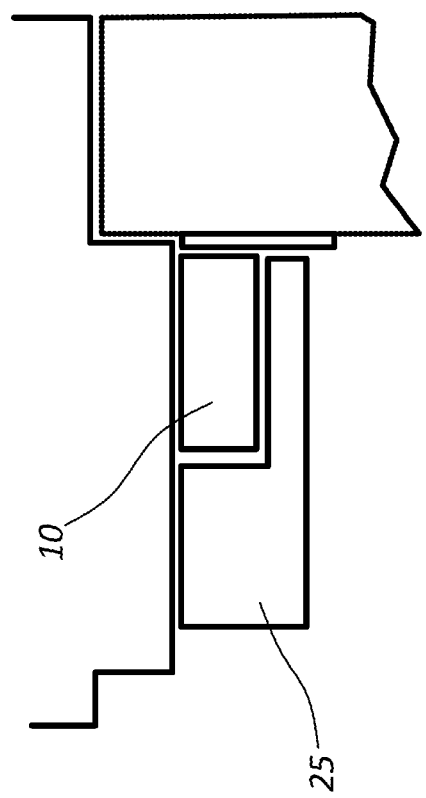
FIG. 6 illustrates an end view of a door coordinator mounted to a soffit with a further prior art accessory mounting bracket in place.
Figure 12:
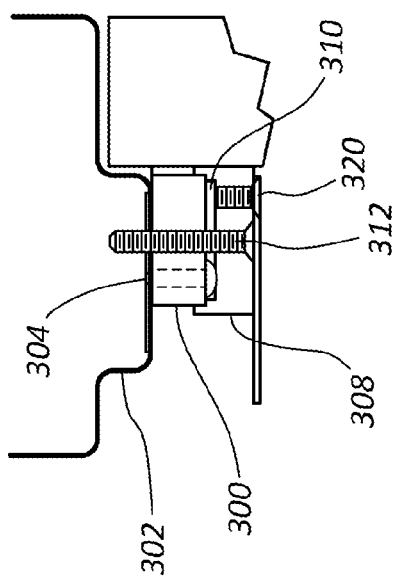
FIG. 12 illustrates a cross section of a door frame, door coordinator, and door coordinator accessory mounting bracket in accordance with the principles of the present invention.

FIGS. 10 to 12 illustrate an alternative embodiment of an accessory mounting bracket 200. In this embodiment, the accessory mounting bracket 200 is a cast or machined piece. Accordingly, the accessory mounting bracket 200 is similarly constructed to the prior embodiment and includes opposed steps 202, 204 that define a channel 206 in an upper side of the accessory mounting bracket 200. The steps 202, 204 extend along the entire length of the accessory mounting bracket 200. Being cast or machined, the accessory mounting bracket 200 may be provided with transversely extending lands, 208, 216 and 218 at desired locations, such as along an end 210 of the accessory mounting bracket 200 or at locations corresponding to bores 220, 222 (which may be countersunk) extending through the accessory mounting bracket 200 and enabling attachment of the accessory mounting bracket 200 over the door coordinator 300. The lands 208, 216, and 218 separate recesses 212, 214, which are formed in the accessory mounting bracket 200 at a depth below the channel 206. The recesses 212, 214 therefore extend a distance that is less than the full length of the accessory mounting bracket 200. FIG. 10 illustrates a cross section of the accessory mounting bracket 200 taken at section A-A in FIG. 9, while FIG. 11 illustrates a cross section of the accessory mounting bracket 200 taken at section B-B.

Figure 14:
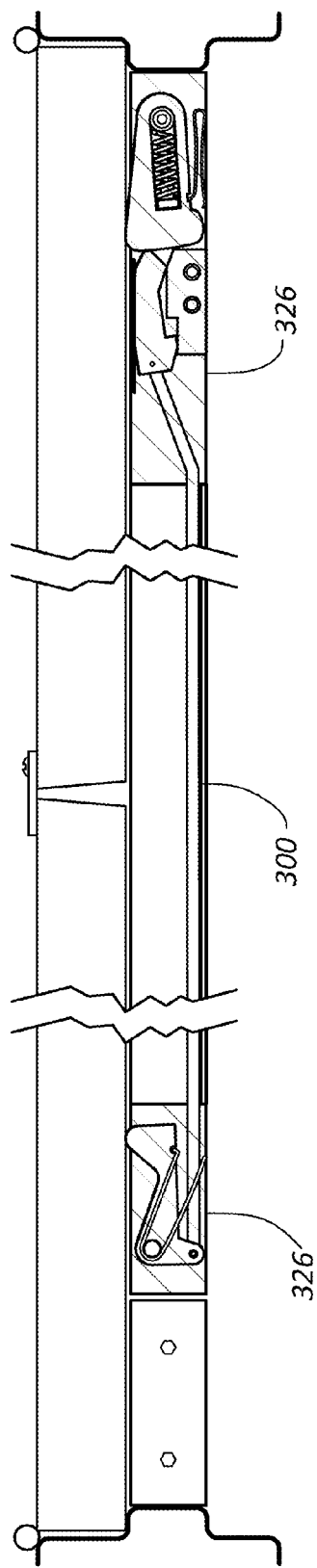
FIG. 14 illustrates a door coordinator and areas in which a mounting screw may not pass.

FIGS. 13, 14, and 15 illustrate the use of an accessory mounting bracket 308, which may be constructed according to either embodiment discussed above, with a door coordinator 300. One such door coordinator is described in U.S. Pat. No. 3,895,461, which is hereby incorporated by reference. More specifically, FIGS. 13 and 14 illustrate the door coordinator 300 being secured to a soffit 302 through the use of screws 304. The screws 304 extend through a bores provided in the door coordinator 300 and into the soffit 302. As seen in the figures, the heads 306 of the screws 304 protrude from the lower surface of the door coordinator 300 and are accommodated in the recess 310 (108, 212, 218) of the accessory mounting bracket 308. The accessory mounting bracket 308 is secured to the soffit 302 by a second set of screws 312 that extends through bores 314 in the accessory mounting bracket 306 and corresponding bores 316 drilled through the door coordinator 300 to allow for mounting of the accessory mounting bracket 306. Once mounted to the door coordinator 300, the accessory mounting bracket 308 provides a surface to which a door accessory 318, such as a parallel arm closer, vertical rod strike, or other soffit applied hardware may be secured through a third set of screws 320. The third set of screws 320 pass through bores 322 in the accessory 318 and into threaded bores 324 formed in the accessory mounting bracket 306. The length of the screws 320 used to mount the accessory 318 to the accessory mounting bracket 308 are chosen so that they do not extend out of the recess 310 and into the channel located thereabove and within which the door coordinator 300 is received.

FIG. 14 illustrates a view from the bottom of the door coordinator 300 showing where the bores 316 used to secure the accessory mounting bracket 308 to the door coordinator 300 may be drilled without impacting the mechanical operation of the door coordinator 300. The cross hatched areas 326 depict those portions of the door coordinator 300 where the bores 316 may not be placed. If the bores 316 were to be placed in the crosshatched areas 326, the screws 312 extending through the door coordinator 300 would interfere with the operation of door coordinator 300. Using the accessory mounting bracket 318, the door accessory 318 can now be positioned in the cross hatched area 326 since the accessory mounting bracket 318 allows for securing of the door accessory 318 in a location offset or spaced apart from the critical areas, areas 326, of the door coordinator 300.

In some embodiments, the accessory mounting bracket 308 may have a length that is shorter than the door coordinator 300, but in other embodiments, the accessory mounting bracket may have a length that extends the entire length of the door coordinator 300 or soffit. The accessory mounting bracket 308 may therefore be the same length as or extend beyond the length of the door coordinator 300 and cover the entire length of the soffit, including any filler bars 328 that may be installed next to the door coordinator.

It should be understood that various changes and modifications to the presently preferred embodiments described herein will be apparent to those skilled in the art. For example, an accessory mounting bracket could have more than two recesses. Or the accessory mounting bracket could have more than two recesses disposed in the first recess. The bracket may use more mounting hardware than was described and the mounting hardware need not be a screw.

We claim:

1. A door coordinator assembly comprising:
   a door coordinator configured to sequence a closing of companion doors, the door coordinator having a lower face; and
   an accessory mounting bracket having a body defining an upper surface, a lower surface, and a length, a pair of opposed steps formed in the upper surface and extending along at least part of the length of the body, the steps defining a channel therebetween with the channel extending along the upper surface for at least part of the length of the body; the channel having a width sized and shaped to receive the lower face of the door coordinator between the opposed steps, a recess formed in the upper surface and disposed beneath the channel, the recess extending at least part way along the length of the body, and a plurality of bores formed in the body and extending from the lower surface of the body to the recess.

2. The door coordinator assembly according to claim 1, wherein the recess has a depth from the channel that defines a standoff from a surface of the door coordinator.

3. The door coordinator assembly according to claim 1, further comprising a second plurality of bores extending through the body from the lower surface to the recess.

4. The door coordinator assembly according to claim 3, wherein the second plurality of bores are threaded.

5. The door coordinator assembly according to claim 1, wherein the channel extends the entire length of the body.

6. The door coordinator assembly according to claim 1, and wherein the body is an extrusion.

7. The door coordinator assembly according to claim 1, wherein the body is a casting.

8. The door coordinator assembly of claim 1, wherein the door coordinator includes a second plurality of bores, the second plurality of bores being disposed in the lower face of the door coordinator and correspondingly aligned with the first plurality of bores.

9. The door coordinator assembly according to claim 1, wherein the first plurality of bores are smooth, non-threaded bores and the accessory mounting bracket further comprises a plurality of threaded bores, the threaded bores being formed in the body and extending from the lower surface of the body to the recess.

10. The door coordinator assembly of claim 9, further comprising a door accessory mounted to the accessory mounting bracket by at least one threaded fastener disposed in one of the threaded bores.

11. The door coordinator assembly of claim 9, further comprising a door accessory mounted to the accessory mounting bracket.

12. The door coordinator assembly of claim 11, wherein the door accessory mounted to the accessory mounting bracket includes one of a standard arm closer, a parallel arm closer, a vertical rod strike or a soffit applied hardware device.

13. The door coordinator assembly according to claim 1, wherein the door coordinator has a first length and the accessory mounting bracket has a second length that is less than the first length of the door coordinator.

14. The door coordinator assembly according to claim 1, wherein the door coordinator has a first length and the accessory mounting bracket has a second length that is greater than the first length of the door coordinator.

15. The door coordinator assembly according to claim 1, wherein the door coordinator has a first length and the accessory mounting bracket has a second length that is equal to the first length of the door coordinator.

* * * * *